(12) United States Patent
Chen et al.

(10) Patent No.: US 8,926,852 B2
(45) Date of Patent: Jan. 6, 2015

(54) METHOD FOR TRANSFERRING GRAPHENE LAYER

(71) Applicants: National Taiwan University, Taipei (TW); National Taiwan Normal University, Taipei (TW)

(72) Inventors: Chun-wei Chen, Taipei (TW); Chia-chun Chen, Taipei (TW); Di-yan Wang, Taipei (TW); I-sheng Huang, Taipei (TW)

(73) Assignees: National Taiwan University, Taipei (TW); National Taiwan Normal University, Taipei (TW)

( * ) Notice: Subject to any disclaimer, the term of this patent is extended or adjusted under 35 U.S.C. 154(b) by 0 days.

(21) Appl. No.: 13/779,043

(22) Filed: Feb. 27, 2013

(65) Prior Publication Data

US 2014/0166197 A1 Jun. 19, 2014

(30) Foreign Application Priority Data

Dec. 19, 2012 (TW) .............................. 101148382 A

(51) Int. Cl.
 C23F 3/06 (2006.01)
 B32B 38/10 (2006.01)
 B32B 37/00 (2006.01)
 C01B 31/00 (2006.01)

(52) U.S. Cl.
 CPC ............... B32B 38/10 (2013.01); B32B 37/025 (2013.01); C01B 31/00 (2013.01); B32B 2311/00 (2013.01); B32B 2313/04 (2013.01); B32B 2457/14 (2013.01)
 USPC ............... 216/79; 216/24; 438/153; 438/199; 438/672

(58) Field of Classification Search
 USPC .............................. 216/24; 438/199, 153, 672
 See application file for complete search history.

(56) References Cited

U.S. PATENT DOCUMENTS 8,426,309 B2 * 4/2013 Ward et al. ..................... 438/672
8,557,686 B1 * 10/2013 Zhu ................................. 438/479

OTHER PUBLICATIONS

Li et al. Science, vol. 324, (2009), pp. 1312-1314.*
Mattevi et al. J.Mater.Chem., vol. 21, (2011) pp. 3324-3334.*
Biedermann et al. New Journal of Physics, vol. 12, (2010) 1-12.*
I-Sheng Huang; "Development of Novel CVD-Graphene Transfer Technique"; Thesis; Jun. 28, 2012; Taiwan.
Sukang Bae et al.; "Roll-to-roll production of 30-inch graphene films for transparent electrodes"; Nature Nanotechnology; Jun. 20, 2010; vol. 5.
Xuesong Li et al.; "Large-Area Synthesis of High-Quality and Uniform Graphene Films on Copper Foils"; Science; Jun. 5, 2009; vol. 324.

* cited by examiner

Primary Examiner — Duy Deo
Assistant Examiner — Maki Angadi
(74) Attorney, Agent, or Firm — Lowe Hauptman & Ham, LLP

(57) ABSTRACT

The present invention discloses a method for transferring a graphene layer. The graphene layer formed on a metal carrier layer is electrostatically adsorbed on a substrate by electrostatic charges, and then the substrate having the graphene layer formed on the metal carrier layer is immersed in an etching solution to remove the metal carrier layer, thereby completing the transfer of the graphene layer. In addition to being able to provide a simple method for transferring the graphene layer, the present invention further solves a problem of retaining organic residues, thus enhancing electrical properties of the transferred graphene layer.

8 Claims, 5 Drawing Sheets

METHOD FOR TRANSFERRING GRAPHENE LAYER

CROSS-REFERENCE

This application claims the priority of Taiwan Patent Application No. 101148382, filed on Dec. 19, 2012. This invention is partly disclosed in a thesis entitled "Development of Novel CVD-Graphene Transfer Technique" on Jun. 28, 2012 completed by I-Sheng Huang.

BACKGROUND OF THE INVENTION

1. Field of the Invention

The present invention relates to a method for transferring a graphene layer, and more specifically to a method for transferring the graphene layer by an electrostatic adsorption technique.

2. Description of the Prior Art

Transparent conductive materials have a very important role in display and solar energy industries. Most of the common transparent conductive materials are n-type metal oxides, which provide high conductivity through providing oxygen vacancies in a structure thereof and doping of other ions or chemical compounds. Among others, indium tin oxide (ITO), due to its superior conductivity, has become an irreplaceable choice in a current panel industry. However, since there is only a limited indium resource, a cost of an ITO target is constantly increased in recent years. Further, when an ITO film is bent, the conductivity thereof is reduced, rendering ITO not suitable for flexible elements. Therefore, there is an imminent need for finding an alternative to ITO.

A discovery of one-atom-layer and suspended graphene in 2004 by A. K. Geim and his researcher team at Manchester University (UK) started a series of researches on graphene. Then, physicists of M. S. Fuhrer's team at Maryland University (USA) proved that graphene at room temperature has an electron mobility higher than that of any other known materials. They also proved that thermal vibration has only very small hindrance to a migration of electrons in graphene. In graphene, vibrating atoms at room temperature generate a resistivity of about 1.0 $\mu\Omega$-cm, which is less than 35% of the resistivity of copper, and making graphene the lowest-resistivity material known at room temperature. The low resistivity and an ultra-thin nature of graphene also allow an application of graphene in thin and tough transparent conductive films. A single-layer graphene layer absorbs only about 2.3% of visible lights.

At present, as a method for transferring a large-area graphene layer, there is a preferable solution in which a high-quality graphene layer is produced on a metal substrate via chemical vapor deposition (CVD), then the high-quality graphene layer is transferred on a substrate as required by a roll-to-roll process (refer to: X. Li et al., Large-area synthesis of high-quality and uniform graphene films on copper foils, Science, 324, 1312-1314, 2009 and S. Bae et al., Roll-to-roll production of 30-inch graphene films for transparent electrodes, Nature Nanotechnol., 5, 574-578, 2010). The above solution shows the most promise in lower costs and scalability for transferring the large-area graphene layer.

However, the metal substrate is supported by a thermal release tape in the solution, and then the high-quality graphene layer is transferred on the substrate as required. Therefore, a problem of retaining organic residues is generated in the manufacturing process, so as to worsen an electrical property of the graphene layer.

Therefore, there is a need to provide a method for transferring a graphene layer that can solve the problem of retaining the organic residues.

SUMMARY OF THE INVENTION

In view of the above-mentioned, the present invention provides a method for transferring a graphene layer for solving a problem of retaining organic residues in the prior art.

To achieve the above object, the present invention provides a method for transferring the graphene layer, and the method comprises the following steps of:
provide a substrate;
provide a graphene layer, and the graphene layer being formed on a metal carrier layer;
execute an electrostatic process to a surface of the substrate so that the surface have electrostatic charges;
electrostatically adsorb the graphene layer formed on the metal carrier layer onto the substrate by the electrostatic charges; and
immerse the substrate having the graphene layer formed on the metal carrier layer into an etching solution to remove the metal carrier layer, while the graphene layer being retained on the substrate.

In one exemplary embodiment of the present invention, the electrostatic charges are negative electrostatic charges.

In one exemplary embodiment of the present invention, the electrostatic charges are positive electrostatic charges.

In one exemplary embodiment of the present invention, a voltage of the electrostatic charges is greater than or equal to 50 volts.

In one exemplary embodiment of the present invention, the substrate is a flexible substrate, a glass substrate, a plastic substrate, a silicon wafer or a silicon wafer having silicon oxide thereon.

In one exemplary embodiment of the present invention, a material of the metal carrier layer is selected from copper, nickel, cobalt, ruthenium, iridium, rhenium, platinum, palladium, or any combination thereof.

In one exemplary embodiment of the present invention, the etching solution comprises a ferric chloride solution, a ferric nitrate solution, a cuprous chloride solution or an ammonium persulfate solution.

In one exemplary embodiment of the present invention, the method further comprises the following step of:
form a protection layer onto the graphene layer.

Furthermore, the present invention provides a method for transferring a graphene layer, and the method comprises the following steps of:
provide a substrate, and the substrate comprises electrostatic charges on a surface;
provide a graphene layer, and the graphene layer being formed on a metal carrier layer;
electrostatically adsorb the graphene layer formed on the metal carrier layer onto the substrate by the electrostatic charges; and
immerse the substrate having the graphene layer formed on the metal carrier layer into an etching solution to remove the metal carrier layer, while the graphene layer being retained on the substrate.

In one exemplary embodiment of the present invention, the electrostatic charges are negative electrostatic charges.

In one exemplary embodiment of the present invention, the electrostatic charges are positive electrostatic charges.

In one exemplary embodiment of the present invention, a voltage of the electrostatic charges is greater than or equal to 50 volts.

In one exemplary embodiment of the present invention, the substrate is a flexible substrate, a glass substrate, a plastic substrate, a silicon wafer or a silicon wafer having silicon oxide thereon.

In one exemplary embodiment of the present invention, a material of the metal carrier layer is selected from copper, nickel, cobalt, ruthenium, iridium, rhenium, platinum, palladium, or any combination thereof.

In one exemplary embodiment of the present invention, the etching solution comprises a ferric chloride solution, a ferric nitrate solution, a cuprous chloride solution or an ammonium persulfate solution.

In one exemplary embodiment of the present invention, the method further comprises the following step of:
form a protection layer onto the graphene layer.

The present invention has obvious advantages and beneficial effects in comparison to the prior art. The method for transferring the graphene layer of the present invention according to the above technical scheme has at least the following advantages and beneficial effects. In the present invention, the graphene layer formed on the metal carrier layer is electrostatically adsorbed on the substrate by the electrostatic charges, and then the substrate having the graphene layer formed on the metal carrier layer is immersed in the etching solution to remove the metal carrier layer, thereby completing the transfer of the graphene layer. In addition to provide a simpler method for transferring the graphene layer, the present invention further solves a problem of retaining organic residues, thus enhancing the electrical properties of the transferred graphene layer.

DETAILED DESCRIPTION OF THE PREFERRED EMBODIMENTS

Embodiments of the present invention are described in detail with the technical matters, structural features, achieved objects and effects with reference to the accompanying drawings as follows.

Figure 1:
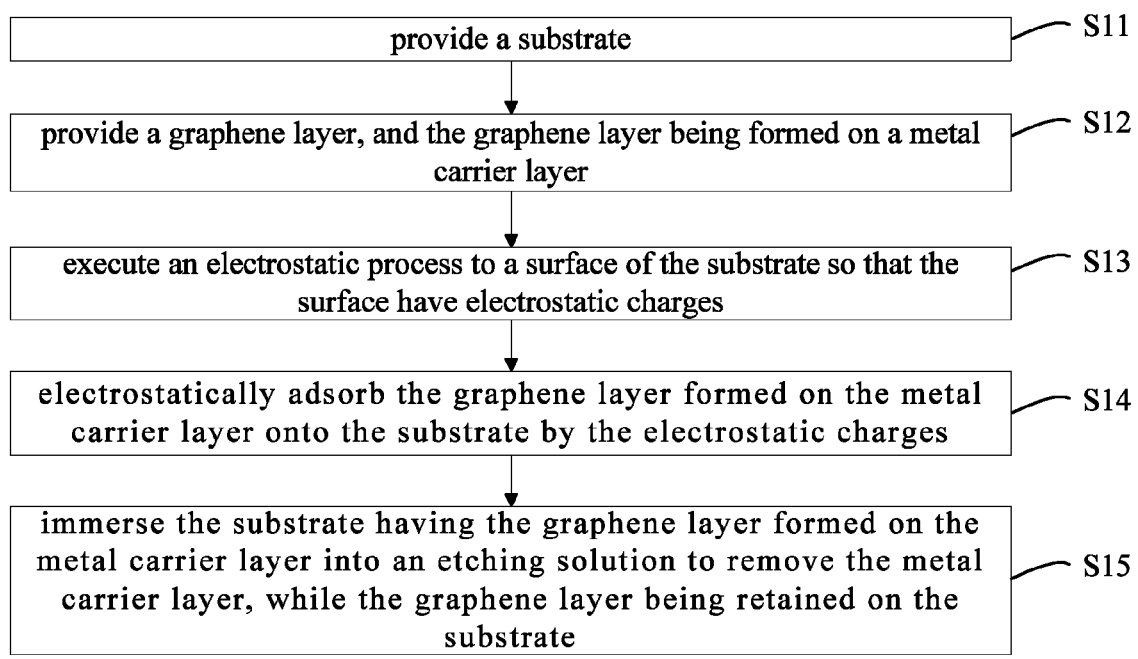
FIG. 1 is a flow chart of a method according to a first embodiment of the present invention for transferring a graphene layer.

Please refer to FIG. 1, FIG. 1 is a flow chart of a method according to a first embodiment of the present invention for transferring a graphene layer, and the method comprises the following steps S11-S15.

In step S11, a substrate is provided. In the present embodiment, the substrate comprises a flexible substrate, a glass substrate, a plastic substrate, a silicon wafer or a silicon wafer having silicon oxide thereon, and the like. However, the present invention is not limited thereto.

In step S12, a graphene layer is provided, and the graphene layer is formed on a metal carrier layer. The graphene layer is produced on the metal carrier layer via chemical vapor deposition. A material of the metal carrier layer can be selected from copper, nickel, cobalt, ruthenium, iridium, rhenium, platinum, palladium, or any combination thereof.

In step S13, an electrostatic process is executed to a surface of the substrate so that the surface has electrostatic charges. The electrostatic charges formed by the electrostatic process can be negative electrostatic charges or positive electrostatic charges, and a voltage of the electrostatic charges is preferably greater than or equal to 50 volts.

In step S14, the graphene layer formed on the metal carrier layer is electrostatically adsorbed on the substrate by the electrostatic charges. Herewith, when one side of the graphene layer formed on the metal carrier layer and the substrate having the electrostatic charges are very close to each other, and induced charges which are opposite to an electric charge of the electrostatic charges will be generated at the side because of an electrostatic induction effect, so as to physically adsorb on the substrate by an electrostatic principle.

In step S15, the substrate having the graphene layer formed on the metal carrier layer is immersed in an etching solution to remove the metal carrier layer, while the graphene layer is retained on the substrate. The etching solution can be a ferric chloride solution, a ferric nitrate solution, a cuprous chloride solution or an ammonium persulfate solution, or the like. Final, a protection layer can be formed on the graphene layer in accordance with requirements of a user, so as to protect the graphene layer. Furthermore, the graphene layer is repeatedly stacked by the method on the substrate in accordance with requirements of the user, so as to achieve a multilayer graphene structure.

Figure 2:
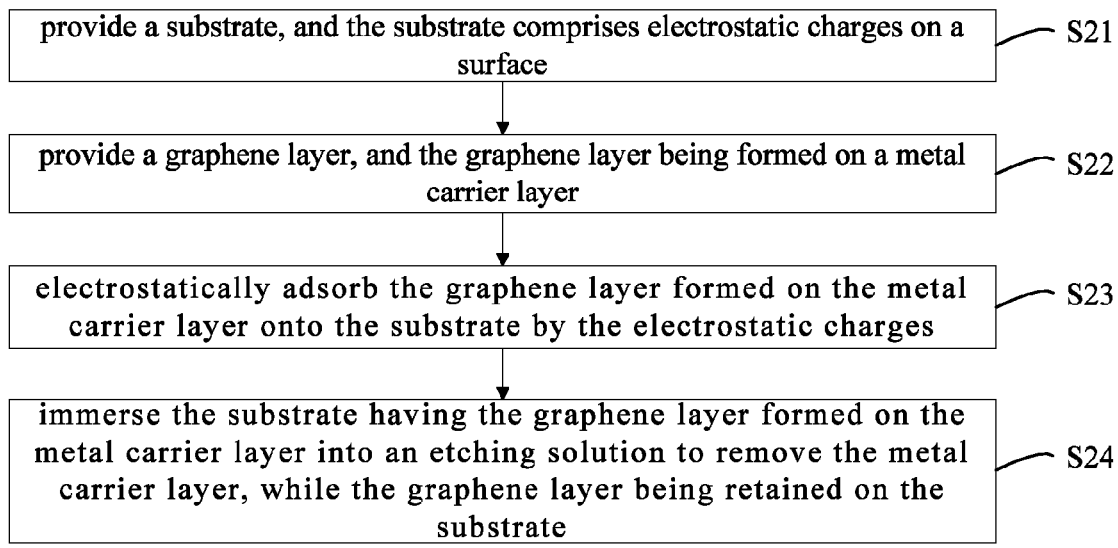
FIG. 2 is a flow chart of a method according to a second embodiment of the present invention for transferring the graphene layer.
Figure 3A:
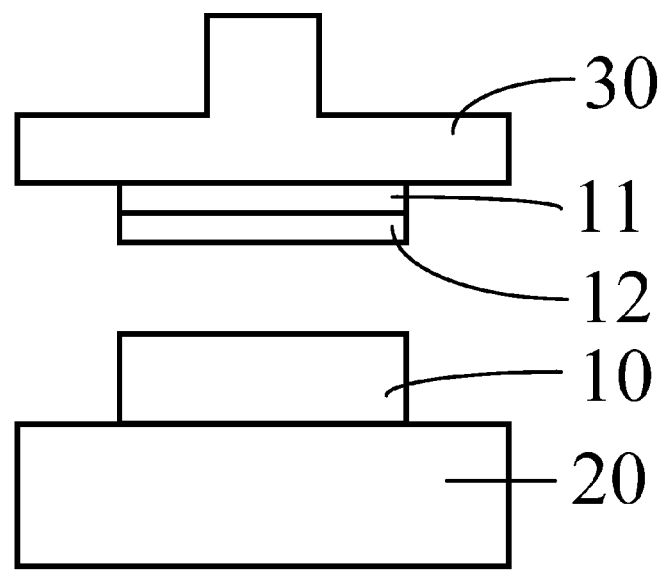
FIG. 3a is a schematic view of a first flow of an embodiment of a method for transferring the graphene layer in accordance with the first embodiment of the present invention.
Figure 3B:
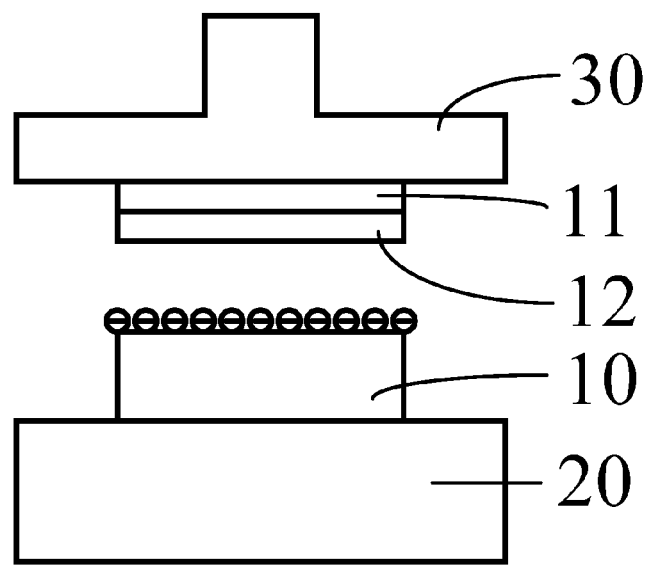
FIG. 3b is a schematic view of a second flow of an embodiment of a method for transferring the graphene layer in accordance with the first embodiment of the present invention.
Figure 3C:
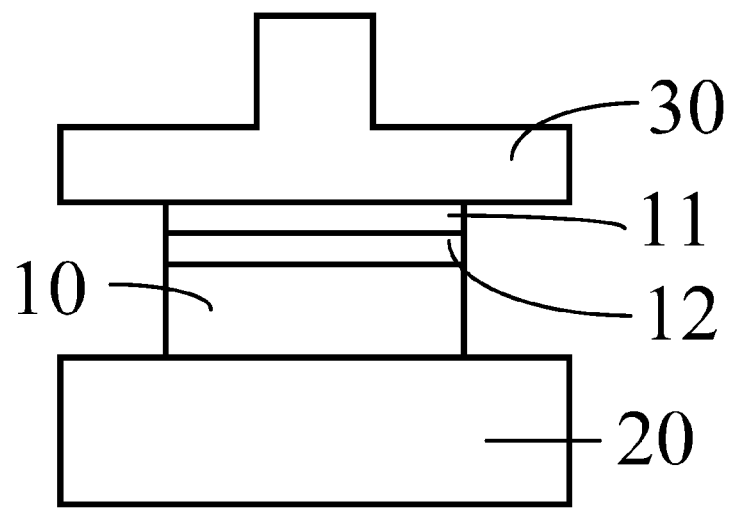
FIG. 3c is a schematic view of a third flow of an embodiment of a method for transferring the graphene layer in accordance with the first embodiment of the present invention.
Figure 3D:
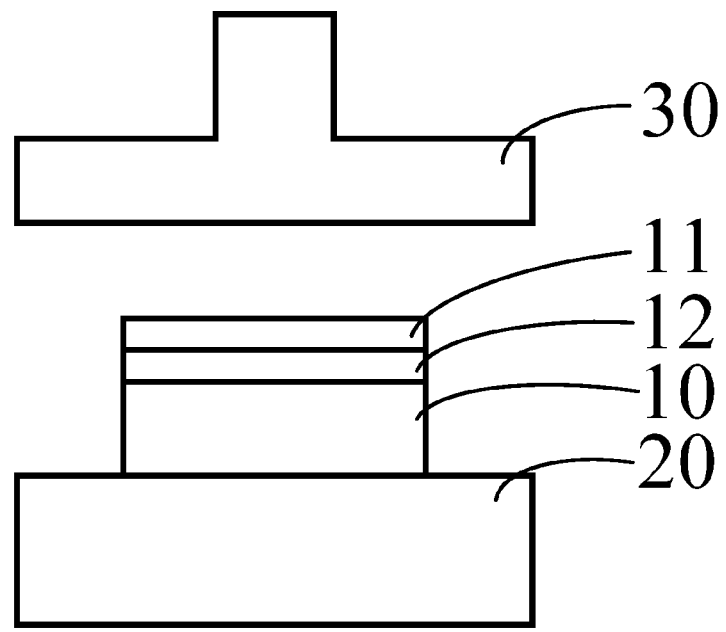
FIG. 3d is a schematic view of a fourth flow of an embodiment of a method for transferring the graphene layer in accordance with the first embodiment of the present invention.
Figure 3E:
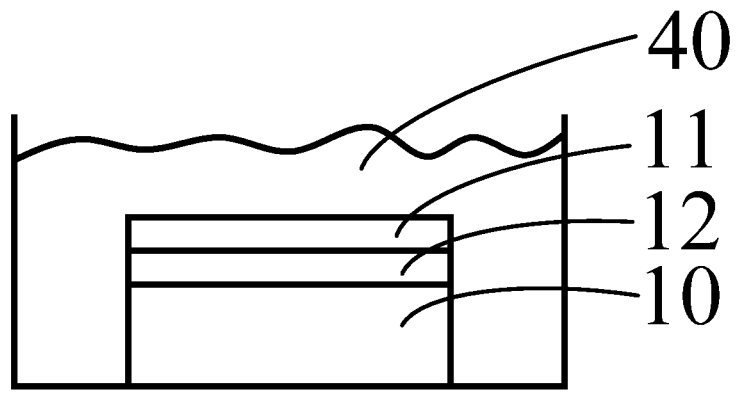
FIG. 3e is a schematic view of a fifth flow of an embodiment of a method for transferring the graphene layer in accordance with the first embodiment of the present invention.
Figure 3F:
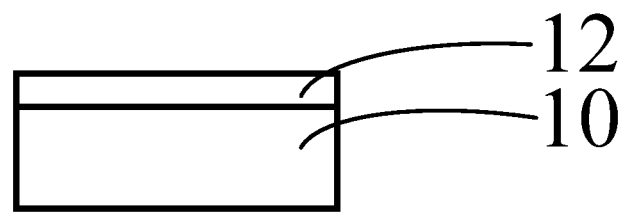
FIG. 3f is a schematic view of a sixth flow of an embodiment of a method for transferring the graphene layer in accordance with the first embodiment of the present invention.

Please refer to FIG. 2, FIG. 2 is a flow chart of a method according to a second embodiment of the present invention for transferring a graphene layer, and the method comprises the following steps S21-S24.

In step S21, a substrate is provided, and the substrate comprises electrostatic charges on a surface thereof. In the present embodiment, the substrate can be a flexible substrate or a plastic substrate, for example. The substrate comprises electrostatic charges, which can be negative electrostatic charges or positive electrostatic charges. A voltage of the electrostatic charges is preferably greater than or equal to 50 volts.

In step S22, a graphene layer is provided, and the graphene layer is formed on a metal carrier layer. The graphene layer is produced on the metal carrier layer via chemical vapor deposition. A material of the metal carrier layer can be selected from copper, nickel, cobalt, ruthenium, iridium, rhenium, platinum, palladium, or any combination thereof.

In step S23, the graphene layer formed on the metal carrier layer is electrostatically adsorbed on the substrate by the electrostatic charges. Herewith, when one side of the graphene layer formed on the metal carrier layer and the substrate having the electrostatic charges are very close to each other, and induced charges which are opposite to an electric charge of the electrostatic charges will be generated at the side because of an electrostatic induction effect, so as to physically adsorb on the substrate by an electrostatic principle.

In step S24, the substrate having the graphene layer formed on the metal carrier layer is immersed in an etching solution to remove the metal carrier layer, while the graphene layer is retained on the substrate. The etching solution can be a ferric chloride solution, a ferric nitrate solution, a cuprous chloride solution or an ammonium persulfate solution, or the like. Final, a protection layer can be formed on the graphene layer in accordance with requirements of a user, so as to protect the graphene layer.

In accordance with the first embodiment, the following specifically describes a method according to the present invention for transferring the graphene layer.

Please refer to FIGS. 3a to 3f, which are in accordance with a method according to the present invention for transferring the graphene layer. A glass substrate 10 and the graphene layer 12 formed on a copper carrier layer 11 are first provided. The glass substrate 10 is disposed on an electrostatic generating workbench 20, and the graphene layer 12 formed on the copper carrier layer 11 is sucked on a position where the glass substrate 10 by a suction device 30. Then, there is an electric field applied to the glass substrate 10 by the electrostatic generating workbench 20, so that a surface of the glass substrate 10 has negative electrostatic charges. Then, the suction device 30 is pressed on the glass substrate 10, as well as the graphene layer 12 formed on the copper carrier layer 11 is electrostatically adsorbed on the glass substrate 10 by the negative electrostatic charges. Then, after suction ability of the suction device 30 is released, the substrate 10 having the graphene layer 12 formed on the copper carrier layer 11 is immersed in a ferric chloride etching solution 40 to remove the copper carrier layer 11, while the graphene layer 12 is retained on the glass substrate 10, thereby completing the transfer of the graphene layer 12.

Then, please refer to Table 1, Table 1 shows comparative results of an electron mobility and a hole mobility between the graphene layer which is transferred by an electrostatic transfer process of the present invention and a graphene layer which is transferred by a roll-to-roll process. In the Table 1, the hole mobility of the graphene layer transferred by the electrostatic transfer process of the present invention is 2992 $cm^2V^{-1}S^{-1}$, that is higher obviously than that the hole mobility of the graphene layer transferred by the roll-to-roll process is 2245 $cm^{-2}V^{-1}S^{-1}$. Furthermore, in parts of the electron mobility, the graphene layer transferred by the electrostatic transfer process of the present invention (1455 $cm^2V^{-1}S^{-1}$) is 2.5 times than the graphene layer transferred by the roll-to-roll process (580 $cm^{-2}V^{-1}S^{-1}$). Therefore, the present invention has more excellent electrical property than the roll-to-roll process.

TABLE 1

| | roll-to-roll process | electrostatic transfer process |
|---|---|---|
| hole mobility | 2245 $cm^2V^{-1}S^{-1}$ | 2992 $cm^2V^{-1}S^{-1}$ |
| electron mobility | 580 $cm^2V^{-1}S^{-1}$ | 1455 $cm^2V^{-1}S^{-1}$ |

As above-mentioned, the graphene layer formed on the metal carrier layer is electrostatically adsorbed on the substrate by the electrostatic charges in the method for transferring the graphene layer of the present invention, and then the substrate having the graphene layer formed on the metal carrier layer is immersed in the etching solution to remove the metal carrier layer, thereby completing the transfer of the graphene layer. In addition to easily transferring a large-area graphene layer, the method further solves a problem of retaining organic residues, thus enhancing the electrical properties of the transferred graphene layer.

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for transferring a graphene layer, the method comprising steps of:
   providing a substrate;
   providing a graphene layer, and the graphene layer being formed on a metal carrier layer;
   providing an electrostatic generating workbench, and disposing the substrate onto the electrostatic generating workbench;
   applying an electric field to the substrate by the electrostatic generating workbench, so that a surface of the substrate has electrostatic charges;
   electrostatically adsorbing the graphene layer formed on the metal carrier layer onto the substrate by the electrostatic charges; and
   immersing the substrate having the graphene layer formed on the metal carrier layer into an etching solution to remove the metal carrier layer, while the graphene layer being retained on the substrate.

2. The method of claim 1, wherein the electrostatic charges are negative electrostatic charges.

3. The method of claim 1, wherein the electrostatic charges are positive electrostatic charges.

4. The method of claim 1, wherein a voltage of the electrostatic charges is greater than or equal to 50 volts.

5. The method of claim 1, wherein the substrate is a flexible substrate, a glass substrate, a plastic substrate, a silicon wafer or a silicon wafer having silicon oxide thereon.

6. The method of claim 1, wherein a material of the metal carrier layer is selected from copper, nickel, cobalt, ruthenium, iridium, rhenium, platinum, palladium, or any combination thereof.

7. The method of claim 6, wherein the etching solution comprises a ferric chloride solution, a ferric nitrate solution, a cuprous chloride solution or an ammonium persulfate solution.

8. The method of claim 1, further comprising:
   forming a protection layer onto the graphene layer.

* * * * *